United States Patent
Horng et al.

(10) Patent No.: US 7,160,442 B2
(45) Date of Patent: Jan. 9, 2007

(54) APPARATUS FOR REDUCTION OF BIOLOGICAL WASTED SLUDGE

(75) Inventors: Ren-Yang Horng, Hsinchu (TW); Wen-Yuang Tzou, Hsinchu (TW); Wang-Kuan Chang, Hsinchu (TW); Min-Chao Chang, Hsinchu (TW); Hsin Shao, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 231 days.

(21) Appl. No.: 10/771,406

(22) Filed: Feb. 5, 2004

(65) Prior Publication Data

US 2005/0023202 A1 Feb. 3, 2005

(30) Foreign Application Priority Data

Jul. 28, 2003 (TW) .............................. 92120581 A

(51) Int. Cl.
*C02F 3/00* (2006.01)
(52) U.S. Cl. ...................... 210/150; 210/151; 210/179; 210/220; 210/743
(58) Field of Classification Search ........ 210/150–151, 210/179, 220, 743
See application file for complete search history.

(56) References Cited

U.S. PATENT DOCUMENTS 5,558,774 A * 9/1996 Tonelli et al. .............. 210/612
6,517,723 B1 * 2/2003 Daigger et al. ............. 210/605
2003/0178364 A1 * 9/2003 Yum et al. .................. 210/623
2004/0178144 A1 * 9/2004 Goldsmith .................. 210/620

FOREIGN PATENT DOCUMENTS

JP            64-75095        *  3/1989

* cited by examiner

*Primary Examiner*—Chester T Barry
(74) *Attorney, Agent, or Firm*—Bacon & Thomas PLLC

(57) ABSTRACT

The apparatus for reducing biological wasted sludge includes a sludge hydrolysis reactor, a sludge neutralization reactor and a membrane bioreactor (MBR). The method of the present invention includes subjecting a biological wasted sludge to hydrolysis and neutralization treatments to offer an intermediate feed suitable to be treated in the MBR. The hydrolyzed sludge and microorganisms are retained in the MBR, so that a further hydrolysis of sludge and decomposition of organics undergo to achieve the objectives of stabilization of sludge and reduction of sludge. Thanks to the filtration membrane of the MBR, specific microorganisms can be acclimated and accumulated in the MBR to decompose substrates in the sludge which are difficult to be decomposed, and an effluent of expected water quality can be meet.

15 Claims, 1 Drawing Sheet

APPARATUS FOR REDUCTION OF BIOLOGICAL WASTED SLUDGE

FIELD OF THE INVENTION

The present invention relates generally to a technique of reducing a biological wasted sludge, and more particularly to a technique of reducing a biological wasted sludge by making a combinative use of a sludge hydrolysis reactor, a sludge neutralization reactor, and a membrane bioreactor.

BACKGROUND OF THE INVENTION

The conventional method of reducing a biological wasted sludge involves the use of aerobic or anaerobic digestion by which the nature of the biological wasted sludge is stabilized. Meanwhile, the sludge dehydration is enhanced. In light of the biological wasted sludge being a solid, the conversion of the biological wasted sludge by a biological digestive process into a biologically usable aqueous solution is a time-consuming process. For this reason, the biological wasted sludge is first treated with a physical or chemical hydrolysis before they are subjected to the aerobic or anaerobic digestion, so as to speed up the hydrolysis of the biological wasted sludge. However, in the wake of the hydrolysis of the biological wasted sludge, a portion of the biological wasted sludge can be further hydrolyzed and decomposed, with a certain proportion thereof incapable of being further decomposed. The non-decomposed portion of the hydrolyzed sludge is formed of minute particles, which are similar in density to water and are therefore susceptible to loss along with the treated water in a biological treatment system, thereby resulting in deterioration in quality of an effluent.

In spite of the fact that the conventional method described above is capable of attaining the stabilization of the nature of the biological wasted sludge and the enhancement of the dehydration of the biological wasted sludge, the conventional method is in fact ineffective in reducing the biological wasted sludge, with its effectiveness ranging from 5 to 10%. The hydraulic residence time (HRT) of the aerobic digestion of the conventional sludge digestive system lasts for 20–30 days as compared with 30 days or more for the anaerobic digestion. For this reason, the conventional method calls for the use of a large reactor in conjunction with a high temperature digestive system. It is therefore readily apparent that the conventional method is not cost-effective.

SUMMARY OF THE INVENTION

The primary objective of the present invention is to provide a cost-effective apparatus and a workable method of reducing biological wasted sludge so as to improve quality of the treated water.

The apparatus of the present invention comprises a sludge hydrolysis reactor, a sludge neutralization reactor, and a membrane bioreactor (MBR), which are used in combination. The method of the present invention involves an initial step in which the biological wasted sludge is hydrolyzed and neutralized, so as to produce an intermediate feed which is guided into the membrane bioreactor in which a solid-liquid separation is carried out by membrane such that the hydrolyzed sludge and the microorganisms are forcibly kept in the membrane bioreactor, thereby enabling the hydrolyzed sludge to be further decomposed by the microorganisms into inorganic matter. As a result, a sludge stabilization and a sludge reduction are attained. In addition, in the present invention specific microorganisms can be acclimated and accumulated in the MBR to decompose substrates in the sludge which are difficult to be decomposed, and an effluent of expected water quality and a significant reduction of the biological wasted sludge can be meet.

The features and the advantages of the present invention will be further described with reference to the following nonrestrictive embodiment, the accompanying drawing, and the comparative examples.

DETAILED DESCRIPTION OF THE PREFERRED EMBODIMENTS

Figure 1:
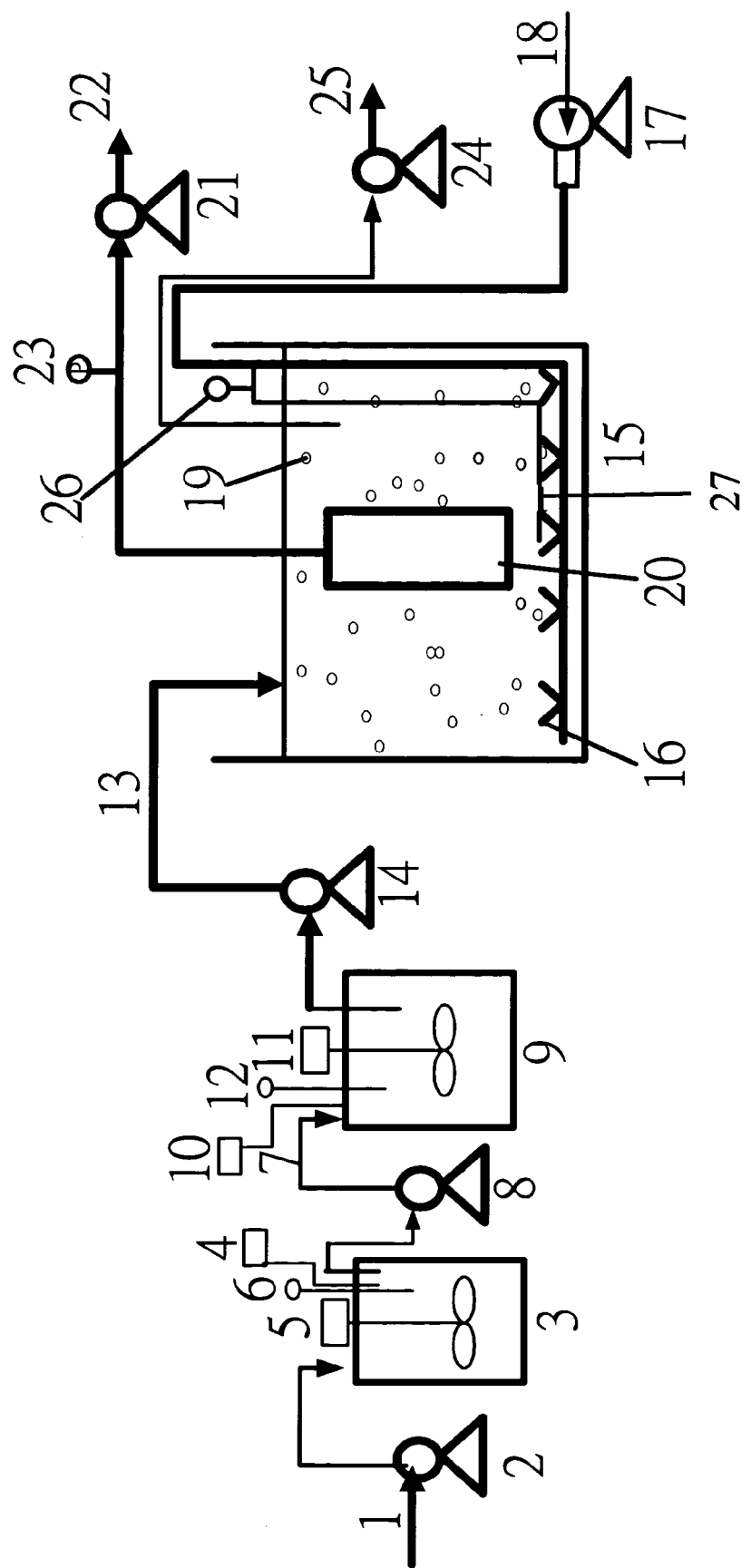
FIG. 1 shows a process flow diagram of the present invention.

The present invention provides an apparatus for reducing a biological wasted sludge, said apparatus comprising:

a hydrolysis reactor for hydrolyzing the biological wasted sludge to become a hydrolyzed sludge;

a neutralization reactor for neutralizing the hydrolyzed sludge to result in production of an intermediate feed; and a membrane bioreactor for effecting a biological decomposition of the intermediate feed;

wherein said membrane bioreactor comprises a filtration module having a permeate side and a contact side in contact with the intermediate feed, wherein liquid contained in the intermediate feed is in fluid communication with the permeate only through the filtration module; and a negative pressure source to enable the liquid to flow out of said membrane reactor via said permeate side as an effluent.

Preferably, said membrane bioreactor is further provided with an aeration device serving to provide the intermediate feed with an external gas. Said aeration device may comprise an aeration pipe and a blower connected with said aeration pipe whereby said blower is used to force the external gas into said membrane bioreactor via said aeration pipe. More preferably, the apparatus of the present invention further comprises a backwash pipe in communication with said blower and said permeate side of said filtration module.

Preferably, said filtration module is of a tubular or cassette construction and is made of a porous material. Said porous material may be a nonwoven material.

Preferably, said filtration module has a flux greater than 0.05 m$^3$/m$^2$·day.

Preferably, said intermediate feed contained in said membrane bioreactor is provided with aerobic, anoxic, or anaerobic microorganisms. In the apparatus of the present invention, the external gas is air or pure oxygen when the intermediate feed is provided with the aerobic microorganism; the external gas is nitrogen or carbon dioxide when the intermediate feed is provided with the anoxic microorganisms; and the external gas is nitrogen, methane or marsh gas when the intermediate feed is provided with the anaerobic microorganisms.

Preferably, said hydrolysis reactor is provided with an agitator for stirring the biological wasted sludge, and a pH controller for regulating pH value of the hydrolyzed sludge. More preferably, the pH controller is used to regulate the pH value of the hydrolyzed sludge such that the pH valve is greater than 9 or smaller than 3.

Preferably, said hydrolysis reactor is provided with an agitator for stirring the biological wasted sludge, and a heater for heating the biological wasted sludge. More preferably, the biological wasted sludge is heated by the heater at a temperature ranging from 50 to 100° C.

Preferably, said neutralization reactor is provided with an agitator for stirring the hydrolyzed sludge, and a pH controller for regulating pH value of the intermediate feed. More preferably, the pH controller is used to regulate the pH value of the intermediate feed such that the pH value of the intermediate feed is greater than 3 or smaller than 9.

Preferably, said neutralization reactor is provided with an agitator for stirring the hydrolyzed sludge, and a heat exchanger for lowering temperature of the hydrolyzed sludge.

Preferably, the biological wasted sludge is obtained from the biological treatment unit of a wastewater treatment plant whereby the biological wasted sludge has a VSS/SS ratio ranging from 0.5 to 0.9, with VSS standing for volatile suspended solids, and with SS standing for total sludge concentration.

An apparatus for reducing a biological wasted sludge constructed according to one of the preferred embodiments of the present invention is illustrated in FIG. 1, wherein a concentrated sludge 1 is fed by a feeding pump 2 into a sludge hydrolysis reactor 3 into which a predetermined amount of a chemical 4 is added. The concentrated sludge 1 and the chemical 4 are mixed in the sludge hydrolysis reactor 3 by an agitator 5, wherein the added amount of the chemical 4 is regulated by a pH controller 6. The hydrolyzed sludge 7 is then transferred by a pump 8 to a sludge neutralization reactor 9 into which a chemical 10 is introduced. With an agitator 11, the chemical 10 and the hydrolyzed sludge 7 are evenly mixed to form a mixture with a pH value of 7. The pH value of the mixture is controlled by a pH controller 12 by which the amount of the added chemical 10 is regulated. As a result, a neutralized sludge 13 is obtained. The neutralized sludge 13 is transferred by a pump 14 to a membrane bioreactor 15 containing microorganisms for hydrolyzing the biological wasted sludge and decomposing organic matter. The membrane bioreactor 15 is provided at the bottom with an aeration pipe 16, which is provided with air 18 in the form of bubbles 19 via a blower 17 connected to the aeration pipe 16. The aeration pipe 16 and the blow 17 constitute an aeration device. The air bubbles 19 are intended to provide the microorganisms with oxygen, which is needed for microbial growth and microbial decomposition of organic matter. In addition, the air bubbles 19 are used to purge the microorganisms and the hydrolyzed sludge, which are attached to the outer side of a filtration membrane tube 20. With a vacuum pump 21, the treated water is drawn out of the membrane bioreactor 15 via the filtration membrane tube 20 and a center passage (not shown in the drawing) of the filtration membrane tube 20. A vacuum pressure gauge 23 is provided on a pipeline for an effluent 22 to record the operation pressure. The microorganisms contained in the reactor 15 can be removed as a discarded sludge 25 by a pump 24, as required. In order to avert the fouling of the membrane 20, the membrane 20 must be periodically backwashed. At the time when the membrane 20 is backwashed, the vacuum pump 21 must be shut off. With the blower 17, a stream of air is forced through a backwash pipe 27 and the center passage of the filtration membrane tube 20, thereby purging the microorganisms and the hydrolyzed sludge attached to the outer side of filtration membrane tube 20. A timer 26 is provided to facilitate the controlling of frequency and duration of the backwash.

The embodiment of the present invention and the comparative Examples 1 and 2 made use of the apparatus illustrated in FIG. 1, except that the Comparative Examples 1 and 2 were respectively provided with an aerobic SBR (sequencing batch reactor), and an anaerobic SBR in place of the membrane bioreactor (MBR) 15 of the embodiment of the present invention.

The MBR, the aerobic SBR, and the anaerobic SBR were made of an acrylic material and were of a square construction (10 cm*10 cm). They had an effective water depth of 100 cm and an effective volume of 10 liters. The MBR and the aerobic SBR were provided at a bottom with an aeration device (flow rate=4.0 L air/min) by which the reactors were provided with oxygen. The anaerobic SBR was provided with an agitator set by means of which the hydrolyzed sludge and the anaerobic sludge were evenly mixed. The filtration membrane tube 20 of the MBR was made of a nonwoven material with an average pore size diameter of 0.03 mm. The nonwoven material was hydrophilic. The filtration membrane tube 20 had a height of 25 cm, an outer diameter of 3 cm, and an inner diameter of 2 cm. The filtration layer of the filtration membrane tube 20 had a thickness of 0.1 cm with the remainder of the thickness thereof serving as a supporting structure.

The biological wasted sludge of the embodiment of the present invention came from the activated sludge system of a paper mill. The properties of the biological wasted sludge is listed in Table 1. The biological wasted sludge has an average total sludge concentration (SS) of 13500 mg/L, a volatile suspended solid concentration (VSS) of 9600 mg/L, and a VSS/SS ratio of 0.72. In operation, the biological wasted sludge was hydrolyzed with sodium hydroxide under a pH value of 12 or more for a duration of two hours. Thereafter, the pH value was adjusted to be neutral with nitric acid. The hydrolyzed sludge with the neutral pH value was used as an intermediate feed of the MBR of the embodiment of the present invention, the aerobic SBR of Comparative Example 1, and the anaerobic SBR of Comparative Example 2.

The operating conditions of the MBR of the embodiment of the present invention and the aerobic SBR of Comparative Example 1 included a sludge concentration (SS) of 2,500 mg/L, a pH value ranging from 6 to 8, a DO over 2 mg/L, and an HRT of 20 days. The operating conditions of the anaerobic SBR of Comparative Example 2 included an initially planted anaerobic sludge concentration of 6000 mg/L or so, which was UASB wasted sludge obtained from a Taiwanese brewery, and an HRT of 20 days. The other operating conditions are contained in Table 2.

TABLE 1 properties* of paper mill biological wasted sludge

| pH | CODs mg/L | CODt mg/L | SS mg/L | VSS mg/L | VSS/SS | TKN mg/L |
|---|---|---|---|---|---|---|
| 6.8 | 350 | 11600 | 13500 | 9600 | 0.72 | 32 |

*CODs, solubility COD; CODt, total COD; TKN, Total Kjeldahl Nitrogen

TABLE 2

Operating conditions

| Item | MBR | aerobic SBR | Anaerobic SBR |
|---|---|---|---|
| Reactor volume (L) | 10 | 10 | 10 |
| Sludge concentration (mg/L) | 2500 | 2500 | 6000 |
| Seeding | Applicant's SBR sludges | Applicant's SBR sludges | Taiwanese Brewery UASB sludges |
| Mode of agitation | Aeration | Aeration | Agitator |
| Dissolved oxygen (mg/L) | 2.0 or over | 2.0 or over | None |
| Mode of operation | Continuous | One cycle per day feeding: 0.5 hr aeration: 20 hrs quiet hour: 3 hrs discharge: 0.5 hr | One cycle per day feeding: 0.5 hr reaction: 20 hrs quiet hour: 3 hrs discharge: 0.5 hr |
| Backwash | 6 cycles per day 1 min/cycle, air | none | none |
| 1st test HRT (day) | 20 | 20 | 20 |
| 2nd test HRT (day) | 10 | 10 | 10 |

Prior to the start of the experiments, the intermediate feed of the MBR, the aerobic SBR, and the anaerobic SBR were placed in a flask for observation the sludge contents, and the sludge reached the brim of the flask. Upon completion of the first test (HRT of 20 days) of the three treatments, an effluent was added to the same flask for observation of the sludge contents. The sludge's heights of the effluents in the flasks were in the order of the anaerobic SBR, the aerobic SBR, and the MBR. The effluent of the MBR contains substantially no SS, thereby indicating an excellent effect of the MBR on reducing the biological wasted sludge. The similar observations were obtained in the second test with the HRT of 10 days. The results of the first test and the second test are listed in Table 3. In the first test, the removal ratios of SS by the MBR, the aerobic SBR, and the anaerobic SBR are respectively 99.5%, 75.9%, and 38.6%. In the second test in which the HRT is shortened to 10 days from 20 days of the first test, the removal ratios of SS by the MBR, the aerobic SBR, and the anaerobic SBR are respectively 98.9%, 18.9%, and 5.5%. On the basis of the data listed in Table 3, it is readily apparent that the MBR of the present invention is superior to the aerobic SBR and the anaerobic SBR in terms of the sludge reduction with the same reactor volume and the same HRT. Accordingly, the MBR of the present invention requires a relatively smaller volume in comparison with the aerobic SBR and the anaerobic SBR at the same removal ratio of SS.

TABLE 3 data of the first test and the second test

| | influent | MBR effluent | Aerobic SBR effluent | Anaerobic SBR effluent |
|---|---|---|---|---|
| First test of SS concentration (mg/L) | 10600 | 50 | 2550 | 6500 |
| SS removal ratio (%) | | 99.5 | 75.9 | 38.6 |
| Second test of SS concentration (mg/L) | 12700 | 135 | 10300 | 12000 |
| SS removal ratio (%) | | 98.9 | 18.9 | 5.5 |

What is claimed is:

1. An apparatus for reducing a biological wasted sludge, said apparatus comprising:

a hydrolysis reactor for hydrolyzing the biological wasted sludge to become a hydrolyzed sludge;

a neutralization reactor for neutralizing the hydrolyzed sludge to result in production of an intermediate feed; and a membrane bioreactor for effecting a biological decomposition of the intermediate feed;

wherein said membrane bioreactor comprises a filtration module having a permeate side and a contact side in contact with the intermediate feed, wherein liquid contained in the intermediate feed is in fluid communication with the permeate only through the filtration module; and a negative pressure source to enable the liquid to flow out of said membrane reactor via said permeate side as an effluent;

wherein said hydrolysis reactor is provided with an agitator for stirring the biological wasted sludge, and a heater for heating the biological wasted sludge;

said neutralization reactor is provided with an agitator for stirring the hydrolyzed sludge, and a heat exchanger for lowering temperature of the hydrolyzed sludge.

2. The apparatus as defined in claim 1, wherein said membrane bioreactor is further provided with an aeration device serving to provide the intermediate feed with an external gas.

3. The apparatus as defined in claim 1, wherein said aeration device comprises an aeration pipe and a blower connected with said aeration pipe whereby said blower is used to force the external gas into said membrane bioreactor via said aeration pipe.

4. The apparatus as defined in claim 3 further comprising a backwash pipe in communication with said blower and said permeate side of said filtration module.

5. The apparatus as defined in claim 1, wherein said filtration module is of a tubular or cassette construction and is made of a porous material.

6. The apparatus as defined in claim 5, wherein said porous material is a nonwoven material.

7. The apparatus as defined in claim 1, wherein said filtration module has a flux greater than 0.05 $m^3/m^2 \cdot day$.

8. The apparatus as defined in claim 1, wherein said intermediate feed contained in said membrane bioreactor is provided with aerobic, anoxic, or anaerobic microorganisms.

9. The apparatus as defined in claim 8, wherein the external gas is air or pure oxygen when the intermediate feed is provided with the aerobic microorganism; wherein the external gas is nitrogen or carbon dioxide when the intermediate feed is provided with the anoxic microorganisms; wherein the external gas is nitrogen, methane or marsh gas when the intermediate feed is provided with the anaerobic microorganisms.

10. The apparatus as defined in claim 1, wherein said hydrolysis reactor is provided with a pH controller for regulating pH value of the hydrolyzed sludge.

11. The apparatus as defined in claim 10, wherein the pH controller is used to regulate the pH value of the hydrolyzed sludge such that the pH valve is greater than 9 or smaller than 3.

12. The apparatus as defined in claim 1, wherein the biological wasted sludge is heated by the heater at a temperature ranging from 50 to 100° C.

13. The apparatus as defined in claim 11, wherein said neutralization reactor is provided with a pH controller for regulating pH value of the intermediate feed.

14. The apparatus as defined in claim 13, wherein the pH controller is used to regulate the pH value of the intermediate feed such that the pH value of the intermediate feed is greater than 3 or smaller than 9.

15. The apparatus as defined in claim 1, wherein the biological wasted sludge is obtained from the biological treatment unit of a wastewater treatment plant whereby the biological wasted sludge has a VSS/SS ratio ranging from 0.5 to 0.9, with VSS standing for volatile suspended solids, and with SS standing for total sludge concentration.

* * * * *